(12) United States Patent
Daigo

(10) Patent No.: US 8,965,194 B2
(45) Date of Patent: Feb. 24, 2015

(54) POSITIONAL INFORMATION RECORDER, IMAGING DEVICE HAVING THE SAME, AND POSITIONAL INFORMATION RECORDING METHOD

(75) Inventor: Kenji Daigo, Sayama (JP)

(73) Assignee: Ricoh Company, Ltd., Tokyo (JP)

( * ) Notice: Subject to any disclaimer, the term of this patent is extended or adjusted under 35 U.S.C. 154(b) by 119 days.

(21) Appl. No.: 13/112,000

(22) Filed: May 20, 2011

(65) Prior Publication Data

US 2011/0293260 A1  Dec. 1, 2011

(30) Foreign Application Priority Data

May 27, 2010  (JP) ................................. 2010-121873

(51) Int. Cl.
| | | |
|---|---|---|
| *G03B 17/24* | (2006.01) | |
| *G01S 5/02* | (2010.01) | |
| *G01S 19/49* | (2010.01) | |
| *G01S 19/51* | (2010.01) | |

(52) U.S. Cl.
CPC ............. *G01S 5/0263* (2013.01); *G01S 5/0284* (2013.01); *G01S 19/49* (2013.01); *G01S 19/51* (2013.01); *G03B 17/24* (2013.01)
USPC ........................................................ 396/310

(58) Field of Classification Search
USPC ........................................... 396/310; 342/191
See application file for complete search history.

(56) References Cited

U.S. PATENT DOCUMENTS

| | | | | | |
|---|---|---|---|---|---|
| 5,712,899 | A | * | 1/1998 | Pace, II ....................... | 455/456.2 |
| 6,282,490 | B1 | * | 8/2001 | Nimura et al. ............ | 340/995.14 |
| 6,532,432 | B1 | * | 3/2003 | Nagatsuma et al. .......... | 702/149 |
| 6,946,991 | B2 | * | 9/2005 | Hasebe et al. ........... | 342/357.31 |

(Continued)

FOREIGN PATENT DOCUMENTS

| | | |
|---|---|---|
| JP | 2003-224877 A | 8/2003 |
| JP | 2004-85511 A | 3/2004 |
| JP | 4312566 | 5/2009 |

OTHER PUBLICATIONS

Office Action issued Aug. 27, 2013 in Japanese Patent Application No. 2010-121873.

*Primary Examiner* — Clayton E Laballe
*Assistant Examiner* — Linda B Smith
(74) *Attorney, Agent, or Firm* — Oblon, Spivak, McClelland, Maier & Neustadt, L.L.P.

(57) ABSTRACT

A positional information recorder includes a receiver configured to receive a wireless signal, an operation section configured to indicate a sign for recording positioning information, a positional information calculator configured to measure a geographical position based on the wireless signal and calculate positioning information according to the position, a positioning information recorder configured to record the calculated positioning information, a movement locus information calculator configured to calculate displacement information including a moving distance and a direction from a standard position, a relative positional information recorder configured to calculate relative positional information according to a relative position from the standard position by the displacement information when the positioning information is not obtained, and record the relative positional information associated with information according to the sign, and a positional information convertor configured to covert into positioning information the relative positional information already recorded in the relative positional information recorder when the positioning information is obtained.

9 Claims, 12 Drawing Sheets

(56) References Cited

U.S. PATENT DOCUMENTS

| | | | |
|---|---|---|---|
| 7,558,595 B2 * | 7/2009 | Angelhag | 455/550.1 |
| 8,369,266 B2 * | 2/2013 | Jin et al. | 370/328 |
| 8,625,020 B2 * | 1/2014 | Cheong et al. | 348/333.06 |
| 2006/0044184 A1 * | 3/2006 | Kimura | 342/357.09 |
| 2010/0097483 A1 * | 4/2010 | Icho et al. | 348/222.1 |
| 2011/0141275 A1 * | 6/2011 | Toda | 348/142 |

* cited by examiner

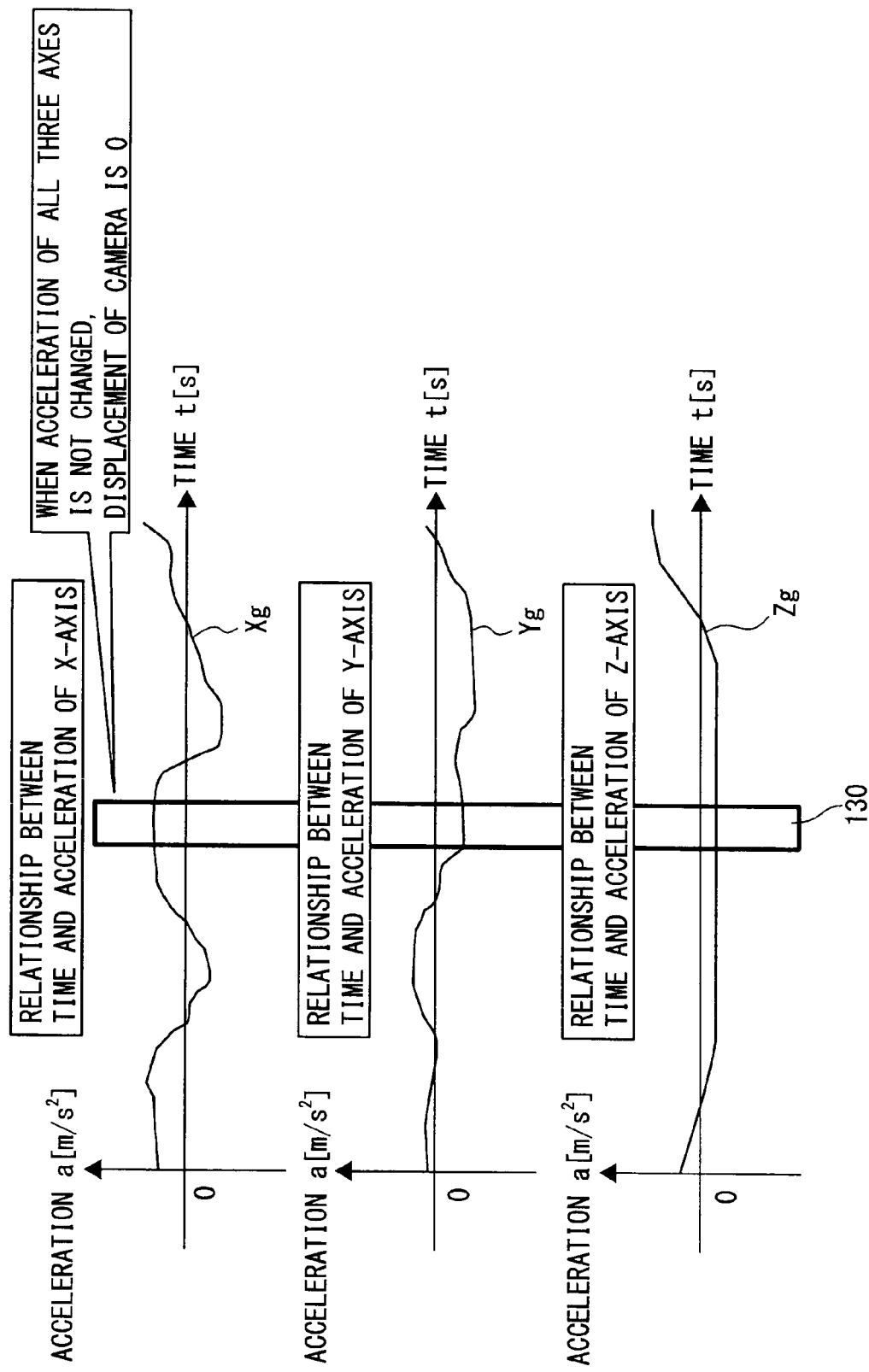

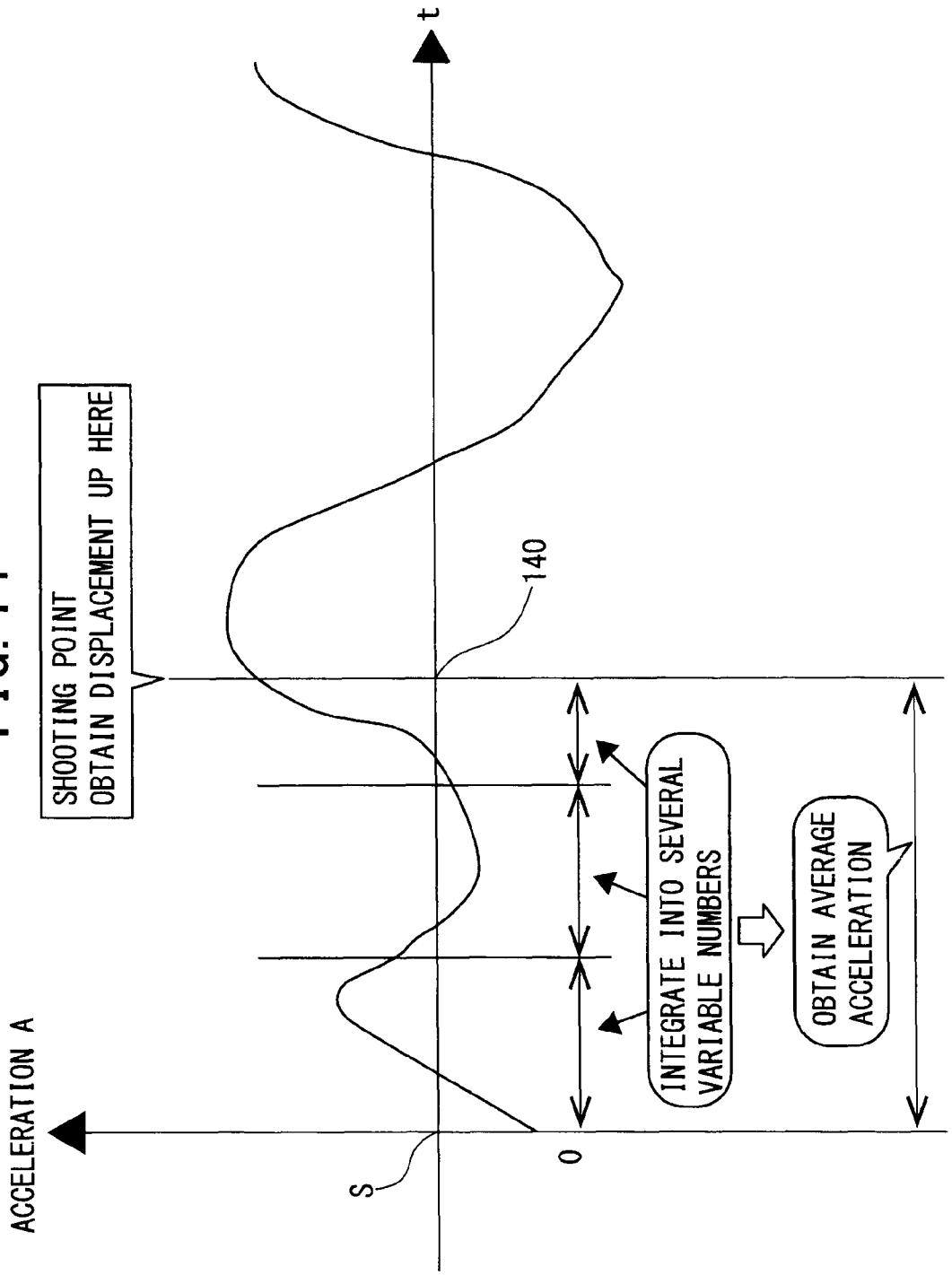

POSITIONAL INFORMATION RECORDER, IMAGING DEVICE HAVING THE SAME, AND POSITIONAL INFORMATION RECORDING METHOD

PRIORITY CLAIM

The present application is based on and claims priority from Japanese Patent Application No. 2010-121873, filed on May 27, 2010, the disclosure of which is hereby incorporated by reference in its entirety.

BACKGROUND OF THE INVENTION

1. Technical Field of the Invention

The present invention relates to a positional information recorder which records positional information, a positional information recording method, and an imaging device having the positional information recorder.

2. Description of the Related Art

A positional information recorder, which receives radio waves, measures a present geographical point based on radio waves, calculates positional information, and records the positional information, often uses GNSS (Global Navigation Satellite System), which measures a position with radio waves from a plurality of satellites. The use of a system with GNSS is not limited to vehicle equipment such as car navigation systems. It has been used in portable devices, cellphones and the like in recent years.

Moreover, imaging devices such as digital cameras have GNSS. In such imaging devices, shot image data in which geographical positional information at the shot point is stored can be recorded. GPS (Global Positioning System) is well-known among positioning systems with GNSS.

Furthermore, systems which measure a present point by using wireless signals from a wireless signal output device disposed in a rod structure without using radio waves from satellites are known.

These systems have a common feature which measures a position by receiving radio waves.

In order to calculate positional information in GNSS, it is necessary to receive radio waves from a plurality of satellites. For this reason, in a poor radio wave receiving point, the position can not be measured. For example, in tunnels and basements, radio waves can not be sufficiently received, so that the positions can not be measured. This is a common problem for not only GNSS but also positioning systems using radio waves.

Some navigation systems which are installed in, for example, vehicles can estimate positional information at the present point by calculating a moving distance and a moving direction from the last measured point with an acceleration sensor and an angular velocity sensor based on positional information measured by then even in a poor radio wave receiving condition.

The navigation systems are not required to record and store estimated positional information because even if the estimated positional information includes some errors, the positional information at the present point is corrected by accurate positional information when the radio wave receiving condition is stabilized.

On the other hand, imaging devices such as digital cameras are required to record positional information at a shot point together with image data. For this reason, it is necessary to record the positional information at that point even in a poor radio wave receiving condition. Moreover, if estimated positional information is recorded, it is desirable to convert the estimated positional information into accurate positional information when the radio wave receiving condition is improved.

More specifically, it is desirable for a positional information recorder which is installed in a device which uses positional information by recording the positional information such as an imaging device to estimate positional information in a poor radio wave receiving condition, and to convert the estimated positional information into accurate positional information when the radio wave receiving condition is improved.

As a standard which records image data associated with positional information, "Image File Format Standard for Digital Still Camera Exif 2.21" (hereinafter, referred to as EXIF Standard) revised in September, 2009 by the Electronics Standards Information Industry Association is known (refer to, for example, JEITA CP-3451A Image File Format Standard for Digital Still Camera Exif 2.21 consolidated edition revised in September, 2009 issued by the Electronics Standards Information Industry Association).

The positional information stored by the EXIF standard is referred to as GEOTAG. GEOTAG is used to express positional information calculated by GNSS installed in an imaging device as the combination of latitude, longitude and altitude, and this is stored in a header portion of an image file.

None of the prior art documents describe the purpose of solving the above-described technical problem, namely, a method of converting positional information recorded in a poor radio wave receiving condition into accurate positional information in a positional information recorder which is installed in a portable use device such as an imaging device. However, Japan Patent Publication No. 4312566 was found as a prior art document associated with the present invention. The invention described in Japan Patent Publication No. 4312566 provides an imaging device having a direction detector which detects a geographical direction of a standard direction of a light receiving surface of an imaging element according to a shooting mode, and the imaging device can record imaging data associated with direction information.

Even if relative positional information can be recorded in a portable device such as an imaging device as a substitute in a poor radio wave receiving condition, if it can not be converted into accurate positional information (positional information by positioning) after that, inaccurate positional information is recorded. Therefore, such a device is inconvenient for a user.

GNSS causes several seconds of time lag until it realizes a positional information calculable condition from activation, namely, a positionable condition by receiving a plurality of radio waves.

This is because a time is required for a process which confirms normal receiving of the predetermined number of radio waves and a process which calculates the present point by the received radio waves, in order to accurately calculate a geographical position (latitude, longitude and altitude).

More specifically, even if an imaging device is in a shootable condition by turning on a power source, if an initialization process of the installed GNSS is not completed, the positional information can not be recorded. If image data is recorded together with the positional information, the shooting can not be started until GNSS realizes a positionable condition after it is completely activated.

SUMMARY OF THE INVENTION

The present invention has been made in view of the above problems, and an object of the present invention is to provide a positional information recorder, a positional information recording method and an imaging device having the positional information recorder, which records relative positional information in a radio wave non-receivable condition, converts the relative positional information recorded by then into positional information obtained by positioning when the condition is improved, and rerecords the positional information.

One embodiment of the present invention provides a positional information recorder, including: a receiver configured to receive a wireless signal; an operation section configured to indicate a sign for recording positioning information; a positional information calculator configured to measure a geographical position based on the wireless signal and calculate positioning information according to the position; a positioning information recorder configured to record the calculated positioning information; a movement locus information calculator configured to calculate displacement information including a moving distance and a direction from a standard position; a relative positional information recorder configured to calculate relative positional information according to a relative position from the standard position by the displacement information when the positioning information is not obtained, and record the relative positional information associated with information according to the sign; and a positional information convertor configured to covert into positioning information the relative positional information already recorded in the relative positional information recorder when the positioning information is obtained.

One embodiment of the present invention also provides an imaging device, including: the positional information recorder; an imaging section configured to obtain an optical image showing a subject via an imaging optical system and an imaging element, and convert the optical image into image data; an image reorder configured to record the image data converted by the imaging section, wherein the operation section includes a release button, and the image data obtained by the operation of the imaging section with the sign is associated with the positioning information or the relative positional information, to be recorded.

One embodiment of the present invention provides a positional information recording method which is performed by a positional information recorder including a receiver configured to receive a wireless signal; an operation section configured to indicate a sign for recording positioning information; a positional information calculator configured to measure a geographical position based on the wireless signal and calculate positioning information according to the position; a positioning information recorder configured to record the calculated positioning information; a movement locus information calculator configured to calculate displacement information including a moving distance and a direction from a standard position; a relative positional information recorder configured to calculate relative positional information according to a relative position from the standard position by the displacement information when the positioning information is not obtained, and record the relative positional information associated with information according to the sign; and a positional information convertor configured to covert into positioning information the relative positional information already recorded in the relative positional information recorder when the positioning information is obtained, including; a step of receiving a wireless signal by the receiver; a step of detecting the sign for recording the positioning information; a step of determining whether or not the positioning information can be calculated by measuring a geographical position based on the wireless signal when the sign is indicated; a step of starting calculation of the displacement information including the moving direction and the direction from the standard position by the movement locus information calculator when the positioning information is not calculated; a step of calculating the relative positional information according to the relative position from the standard position by the displacement information when the positioning information is not calculated if the sign is indicated; a step of recording the calculated relative positional information associated with the information according to the sign; and a step of converting the relative positional information already recorded in the relative positional information recorder into the positioning information when the positioning information is calculated.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

FIG. 13 is a schematic view illustrating an example of the temporal change of the output signals of the acceleration detector of the positional information recorder according to the embodiment of the present invention.

FIG. 14 is a schematic view illustrating one example which calculates average acceleration from the output signal of the acceleration detector of the positional information recorder according to the embodiment of the present invention.

DETAILED DESCRIPTION OF THE PREFERRED EMBODIMENTS

Hereinafter, embodiments of a positional information recorder, a positional information recording method and an imaging device having the positional information recorder will be described with reference to the drawings.

The positional information recorder according to the present invention is not limited to a recorder which is installed in an imaging device. However, in the following embodiments, a positional information recorder which is installed in an imaging device will be described.

Figure 1:
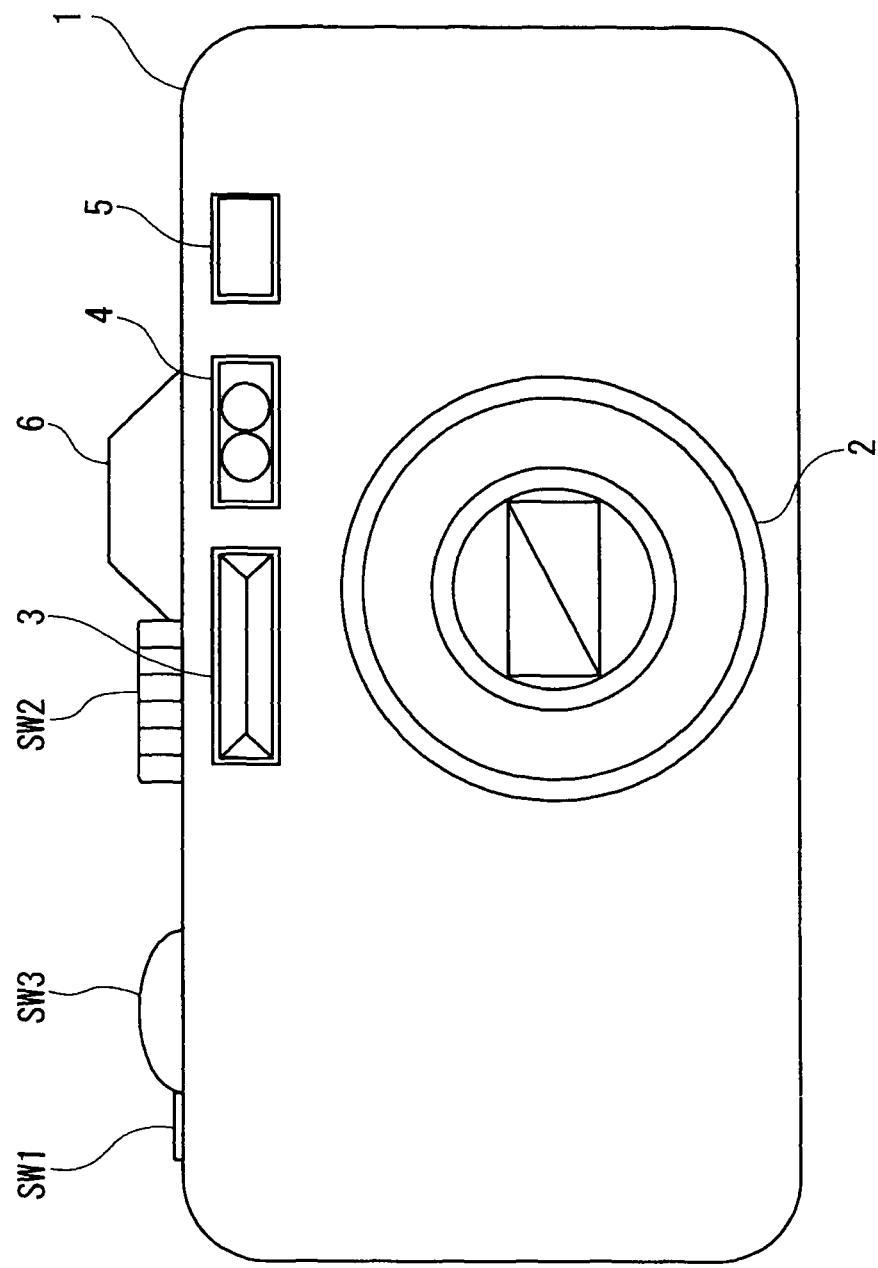
FIG. 1 is a front view illustrating an example of an imaging device having a positional information recorder according to an embodiment of the present invention.

FIG. 1 is a front view illustrating an example of an external appearance of an imaging device having a positional information recorder according to an embodiment of the present invention. An imaging device 1 in FIG. 1 includes a lens barrel unit 2 having a zoom lens and a focus lens at the front. The imaging device 1 also includes a strobe light emitting section 3, a ranging unit 4 which measures a distance to a subject, and an optical finder 5. The imaging device 1 includes on the top surface thereof a release button SW1 which is a shutter switch, a mode dial SW2 for selecting a shooting mode and a jog dial switch SW3.

The imaging device 1 includes on the top surface thereof an antenna 6 for receiving a plurality of radio waves for use in positioning. The antenna 6 is not limited thereto as long as it is located in a position which can easily receive radio waves.

Figure 2:
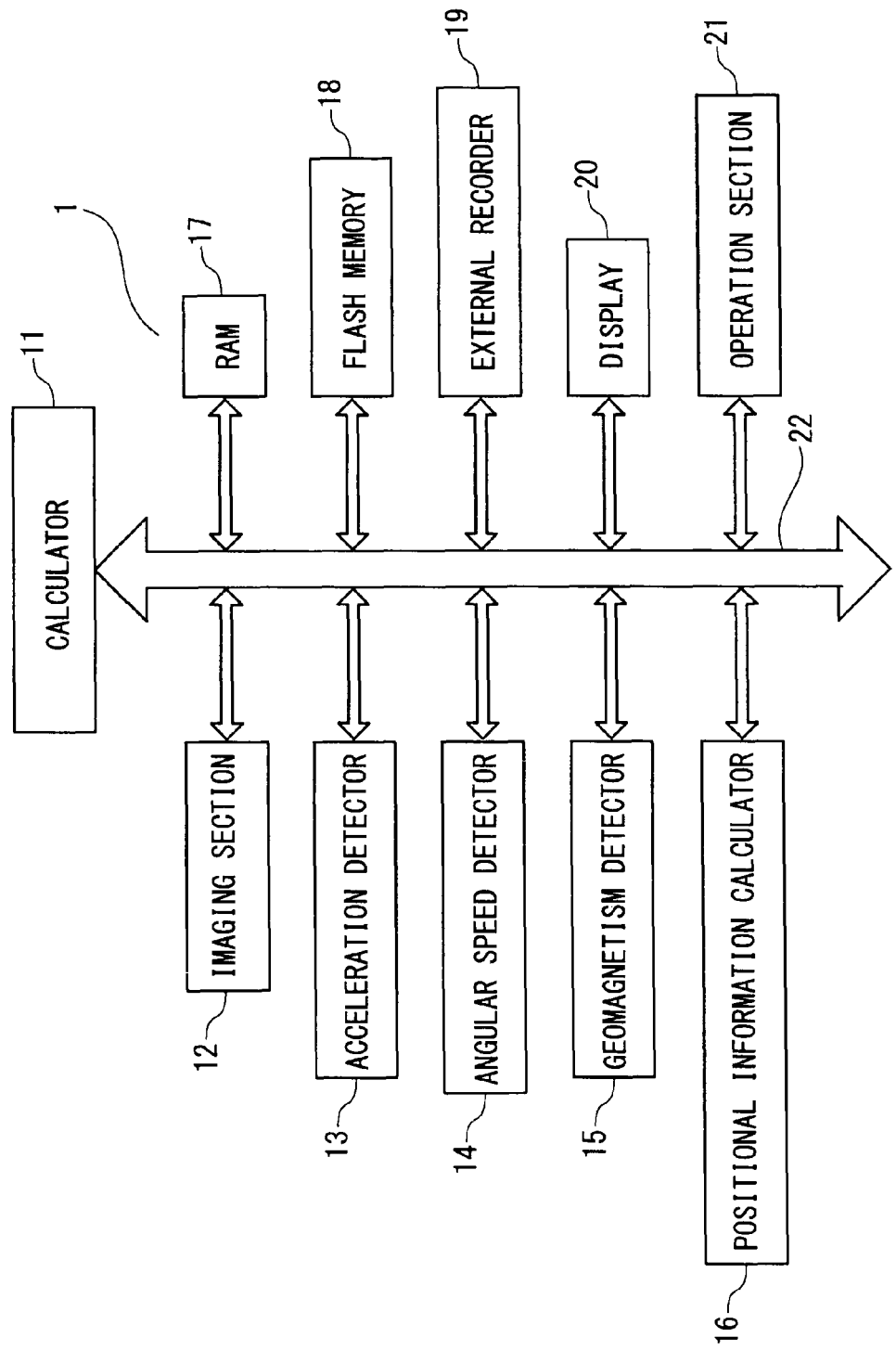
FIG. 2 is a block diagram illustrating an example of a control system for use in the imaging device.

Next, an example of a functional block of the imaging device 1 will be described with FIG. 2. As illustrated in FIG. 2, the imaging device 1 includes a calculator 11 which is a processor for controlling the entire operation of the device and a data bus which connects each processor.

The imaging device 1 includes an imaging section 12 which converts a subject image obtained via an imaging optical system into image data, and generates an image file, a display 20 which displays the image data and an operation menu, an operation section 21 which detects the input of the release button SW1 and the mode dial SW2, and an external recorder 19 which records the image file. The imaging device 1 further includes an acceleration detector 13 having an acceleration sensor, an angular speed detector 14 having an angular speed sensor, a geomagnetism detector 15 having a geomagnetism sensor and a positional information calculator 16 having GNSS, which calculates positional information by measuring the present point from a plurality of radio waves received by the antenna 6.

The imaging device 1 also includes a RAM 17 which is used as a work area when performing various calculation processes in the calculator 11 and a recording area which temporarily records the result of the calculation process, and a flash memory 18 which records movement locus information to be described, relative positional information, and positional information obtained by measuring, storing and recording of the image data.

The calculator 11 calculates a transfer pathway of the device by the output from the acceleration detector 13, the angular speed detector 14 and the geomagnetism detector 15. The information according to the transfer pathway is the movement locus information. The relative positional information is calculated based on the movement locus information.

The calculator 11 calculates the relative positional information according to the movement locus information by predetermined input (sign) from the operation section 21, and records the information in the flash memory 18.

The positional information detector 16 measures a geographical position at the present point from the radio waves (wireless signals) received via a not shown antenna, and calculates the positional information (positioning information) according to that position. The calculated positional information is recorded in the flash memory 18.

The positional information recorder according to the embodiment of the present invention includes the calculator 11, the acceleration detector 13, the angular speed detector 14, the geomagnetism detector 15, the positional information detector 16, the RAM 17, the flash memory 18 and the external recorder 19.

Next, an example of a positional information recording method in the positional information recorder according to the embodiment of the present invention will be described with reference to the flow charts together with the embodiment of the imaging device. In each flow chart, each of the steps is denoted by (S1), (S2) . . . .

Figure 3:
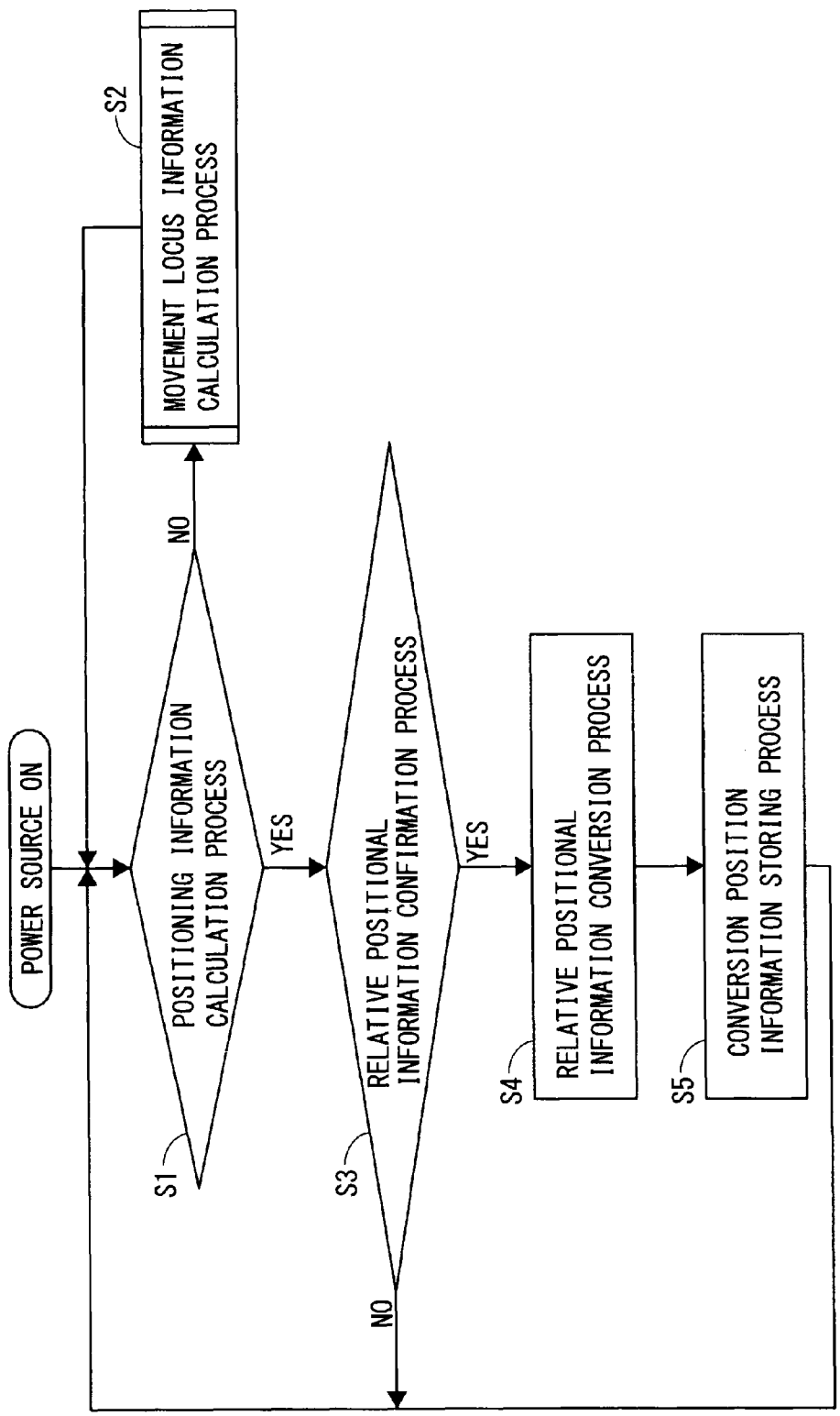
FIG. 3 is a flow chart illustrating an example of a positional information calculation process which is performed by the positional information recorder according to the embodiment of the present invention.

At first, the embodiment of the positional information recording method will be described with reference to the flow chart in FIG. 3.

If the operation of the device (for example, imaging device) is started by turning on a power source, the initialization process of the positional information calculator 16 is performed, and the receiving of the radio waves is started. The positioning can not be performed for a while just after the activation of the device until the radio waves are sufficiently received because of a time lag (NO in S1). After a while, the device realizes a positionable condition, so that the positioning information is calculated at predetermined time intervals, and the information is sequentially recorded in the flash memory 18 (S1).

A positioning information calculation process (S1) is a process which calculates positioning information for specifying the geographical position at the present point according to the radio waves received from the satellite, and includes a process which determines whether or not the device is in a positioning information calculable condition. Accordingly, if the device is not in the positioning information calculable condition (NO in S1), a movement locus information calculation process (S2) is started, and the calculation of the movement locus information is continued until the device realizes the positioning information calculable condition. The details of the movement locus information calculation process (S2) will be described.

"Positioning information calculable condition" is a condition in which radio waves from a predetermined number of satellites are normally received. The predetermined number of satellites is, for example, 4. When the radio waves from the four satellites are normally received, the positioning information having latitude, longitude and altitude can be calculated.

The positioning information format can be expressed as (Gx, Gy, Gz) by indicating latitude (Gx), longitude (Gy) and altitude (Gz) with values of predetermined units, for example. This positioning information can be recorded in the flash memory 18 or stored in the header information of the image file by this format.

If the device realizes the positioning information calculable condition (positionable in SD, it is determined whether or not the relative positional information is recorded during the positioning inability period (S3). If the relative positional information is not recorded (NO in S3), the process returns to S1.

Namely, in the positioning information calculable condition, if the relative positional information is not recorded, the positioning information is repeatedly calculated, and is recorded in the flash memory 18.

When the device realizes the positioning information calculable condition (YES in S1), if the relative positional information recorded during the positioning inability period is recorded (YES in S3), a process which converts the recorded relative positional information into the positioning information is performed (S4). The converted positioning information is stored in a predetermined recording area (S5). The above processes are repeated until the power source of the device is turned off.

Figure 6:
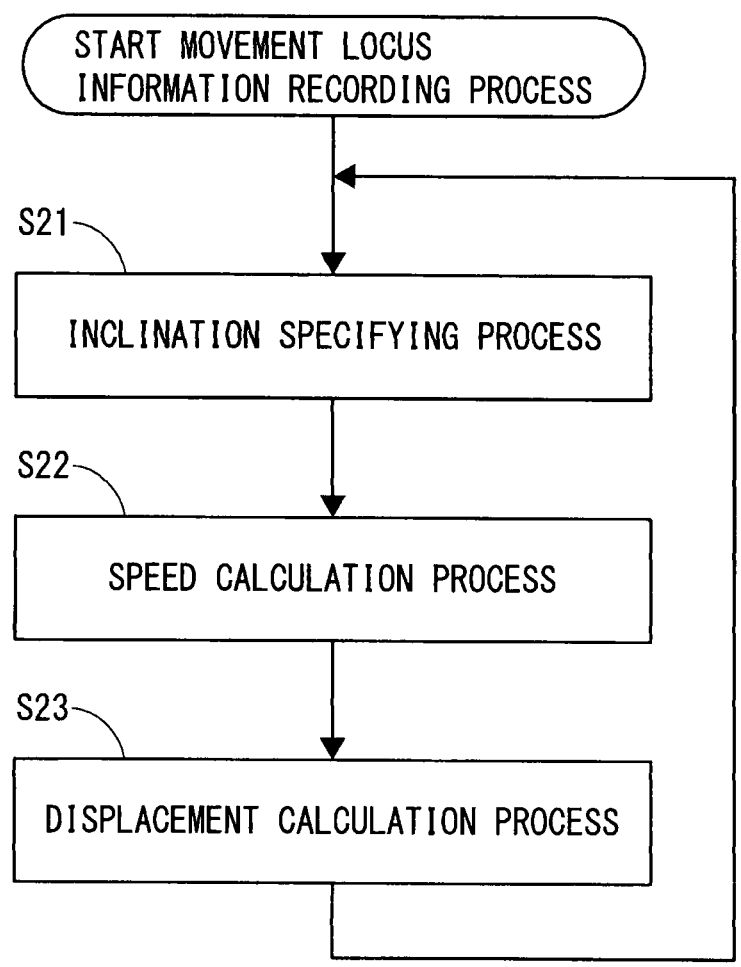
FIG. 6 is a flow chart illustrating an example a movement locus information recording process which is performed by the positional information recorder according to the embodiment of the present invention.

Here, the detailed flow of the movement locus information calculation process (S2) will be described with reference to the flow chart in FIG. 6. If the movement locus information calculation process (S2) is started, an inclination specifying process (S21) is performed.

The inclination specifying process (S21) is a process which specifies the moving posture of the positional information recorder. For example, the moving posture of the body of the imaging device is not always necessary to be maintained in a horizontal condition, and the imaging device rather moves in various postures.

Since the moving locus information is information for use in the calculation of the relative positional information, it is necessary to calculate after fully understanding the moving direction of the device.

For this reason, it is necessary to specify the direction (inclination) of the acceleration detector 13 and the angular speed detector 14.

By specifying the inclination, the displacement including the moving direction and the moving amount of the device can be calculated based on the output of the acceleration detector 13.

Figure 10:
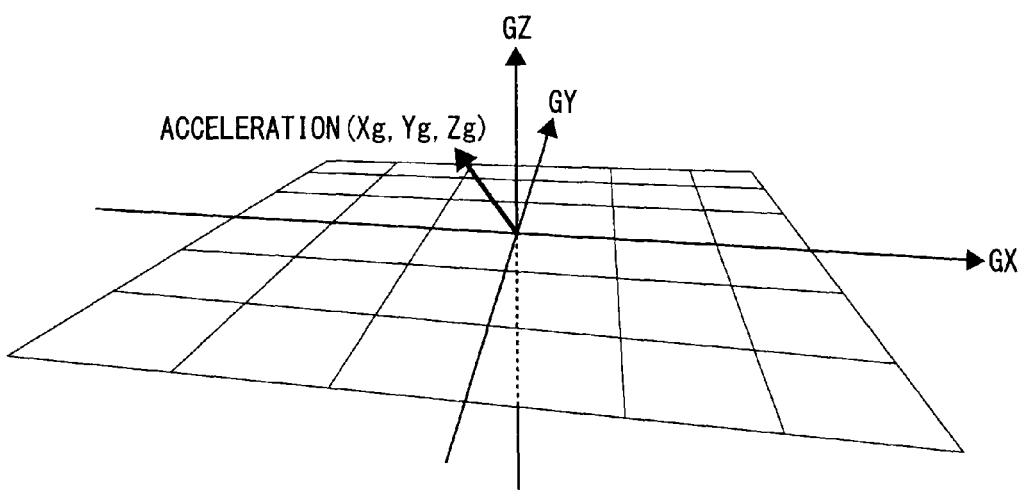
FIG. 10 is a schematic view illustrating a general outline of an output signal of an acceleration detector in the positional information recorder according to the embodiment of the present invention.

FIG. 10 illustrates an image of a signal output from the acceleration detector 13. The output of the X-axis corresponding to the latitude direction, Y-axis corresponding to the longitude direction and Z-axis corresponding to the altitude direction is indicated by Gx, Gy, Gz, respectively. With the intersection of these axes as a reference point, the combination of the output of the direction of these axes is output as acceleration (Xg, Yg, Zg).

Figure 11:
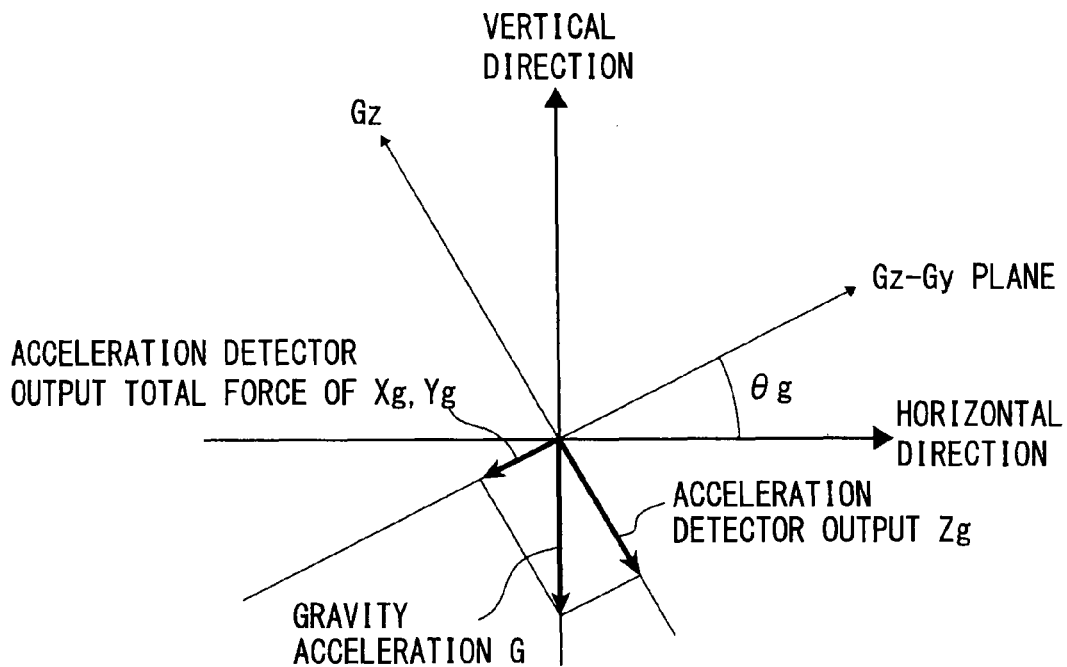
FIG. 11 is a schematic view illustrating a principle which specifies an inclination from the output of the acceleration detector of the positional information recorder according to the embodiment of the present invention.

FIG. 11 illustrates an example of a method of specifying an inclination from the output data of the acceleration detector 13 in the inclination specifying process (S21). In FIG. 11, the acceleration (Xg, Yg, Zg) output from the acceleration detector 13 includes an inclination by $\theta g$, compared to the axis of the vertical direction and the axis of the horizontal direction of the body of the device. This inclination angle $\theta g$ is equal to the gap angle of the Z-axis and the X-axis and Y-axis plane (Gx-Gy plane). Since the gravity acceleration G always acts in the vertical direction, the inclination angle $\theta g$ can be calculated by using the Z-axis output (Zg) of the acceleration detector 13 and the gravity acceleration G. The relationship of $\sin \theta g = Zg/G$ is established among the inclination angle $\theta g$, the gravity acceleration G and the Z-axis output.

Figure 12:
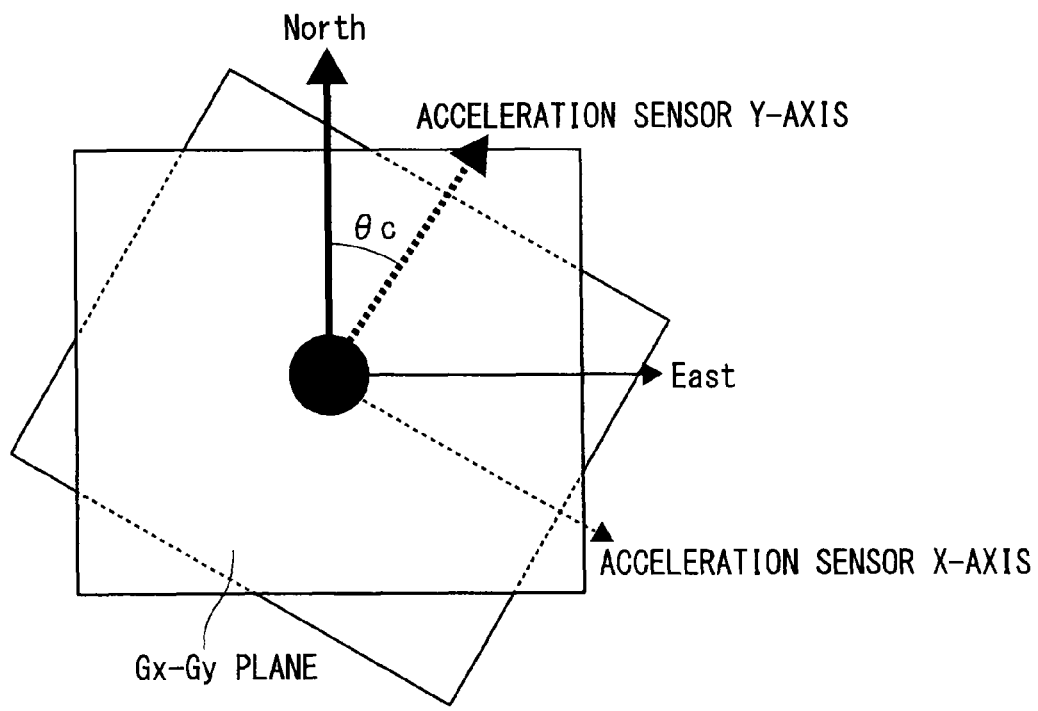
FIG. 12 is a schematic view illustrating a principle which specifies an inclination from the output of a geomagnetism detector of the positional information recorder according to the embodiment of the present invention.

FIG. 12 illustrates a method of specifying the inclination of the X-axis by the output of the geomagnetism detector 15. The geomagnetism detector 15 detects North. In general, North is a standard orientation. By using the standard orientation which is detected by the geomagnetism detector 15, as illustrated in FIG. 12, the inclination ($\theta c$ illustrated in FIG. 12) of Y-axis from North can be calculated.

The gap angle (inclination) of the X-axis of the acceleration detector 13 and the X-axis and Y-axis plane (Gx-Gy plane) is equal to the gap of the Y-axis of the device from North.

If the Y-axis of the device directs in the standard orientation (North), the output of the geomagnetism detector 15 is 0°, and if Y-axis of the device directs East (the device inclines in lateral), the output of the geomagnetism detector 15 becomes 90°.

As described above, by the output of the acceleration detector 13 and the output of the geomagnetism detector 15, the above $\theta g$, $\theta c$ can be calculated. By these inclination $\theta g$, $\theta c$, the 3D vector information (Xg, Yg, Zg) of the acceleration detector 13 can be converted into vector information of the vertical and horizontal standard (North standard).

This vector conversion process can be performed by resolving into the vertical and horizontal components at first, and then resolving the horizontal component into the East component (X component) and North component (Y component).

As described above, the inclination of the device can be specified by the output of the acceleration detector 13 and the geomagnetism detector 15.

If the inclination is specified, the moving direction can be specified, so that a process which calculates a moving speed is conducted next (S22).

Here, cautions of the moving speed calculation in portable devices such as the positional information recorder and the imaging device according to the embodiment of the present invention will be described.

Even when the device is in a resting state without moving, the acceleration detector 13 outputs the gravity acceleration G.

Therefore, it is necessary to remove a time in which the gravity acceleration G is only output from a time for use in the calculation of the speed. For this reason, it is necessary to determine whether the device is in a resting state, is moved or is moved at constant velocity when the output of the acceleration detector 13 is equal to the gravity acceleration G.

FIG. 13 illustrates an image of a signal output from the acceleration detector 13. In FIG. 13, the vertical axis illustrates measurement of output, i.e., acceleration and the horizontal axis illustrates a time.

As illustrated in FIG. 13, the acceleration (Xg, Yg, Zg) of each axis of the acceleration detector 13 changes with time.

As far as living on earth, it is impossible for moving of people and vehicles to continue at uniformly accelerated motion for a long period of time. If people and vehicles are moving, any of the three axes outputs acceleration which is different from gravity acceleration G. Therefore, when the output displacement of the acceleration of three axes does not change for a predetermined time (when the same acceleration is output by all of the three axes), it is determined as a resting state, and this period is removed from the calculation of the movement locus information.

In FIG. 13, the acceleration of the three axes surrounded by a rectangle 130 is a constant value. Accordingly, it is determined that the device is in a resting state during this period. In the after-described speed calculation process, the speed calculation process (S22) is performed with the exception of the total time of this period.

However, since an error may be increased by this method, the inclination is specified by using the output signal of the angular speed detector 14 together with the output signal of the angular speed detector 14 in order to more accurately calculate the movement locus information. When the angular speed detector 14 is used, it is determined that the device is in a resting state when the output of the angular speed detector 14 is 0 for a predetermined time or more without using the above method. In fact, the angular speed sensor of the angular speed detector 14 outputs noise even in a resting state. For this reason, it is determined as a resting state when the output of the angular speed detector 14 is a constant level or below.

The speed calculation process (S22) will be described in light of the above description. It is determined whether or not the device is in a resting state by using the above-described method, and the data for use in the calculation of the moving speed is selected from the acceleration in X, Y, Z directions output from the acceleration detector 13.

The acceleration detector 13 outputs data at arbitrary time intervals (periods). Accordingly, the calculation process described with reference to FIGS. 11, 12, 13 is performed in each of the three axes of the North direction (X-axis), the East direction (Y-axis) and the vertical direction (Z-axis).

Therefore, when the output period of the acceleration detector 13 is small, the error is small, so that the moving locus information having high accuracy can be calculated. However, if the output period is decreased, the duty of the calculation process is increased to disturb another calculation process, so that power consumption is increased. For this reason, the moving form is analyzed from the displacement pattern (example in FIG. 13) of the output signal of the acceleration detector 13, and it is analyzed whether the movement is by walking, by car or by train, and then the calculation interval appropriate for each moving form can be selected.

If the output signals of the acceleration detector 13 are integrated in each speed calculation process (S22), the calculation duty is increased to disturb the power consumption and another calculation process. For this reason, it is preferable to previously integrate the output of the acceleration detector 13 at intervals in which the speed calculation process does not overflow, and to calculate the average acceleration during that period.

FIG. 14 illustrates an image calculating an average acceleration. In FIG. 14, the vertical axis illustrates acceleration of each of the three axes, and the horizontal axis illustrates a time. The average acceleration from the standard point S to the arbitrary point 140 can be calculated by integrating the acceleration during this period. Therefore, if the time from the standard point S to the arbitrary point 140 is long, the integration process may overflow, and the calculation duty of the integration process may become too high. Consequently, there is a possibility of causing defects.

Accordingly, the average acceleration is calculated by the arbitrary point 140 (for example, shooting process timing) at predetermined intervals, in the point 140, the average is calculated by combining the average acceleration of each period, and the average acceleration of the entire process is calculated.

As described above, after calculating the average acceleration A to arbitrary points in each of the X-axis, Y-axis and Z-axis, the speed V at the point 140 can be calculated by $V=At+C$ (equation 1) where the time to the arbitrary point 140 is t, and the speed calculated by the previous speed calculation process is C.

Accordingly, by using the equation 1, the speed in each of the X-axis, Y-axis and Z-axis can be calculated (S22).

Next, a displacement calculation process (S23) is performed. The displacement is a distance from the relative position (0, 0, 0) as a standard to each of the X-axis direction, Y-axis direction and Z-axis direction.

The displacement (Px, Py, Pz) which is a distance from each of the X-axis direction, the Y-axis direction and Z-axis direction can be calculated from the speed (Vx, Vy, Vz) of X-axis, Y-axis and Z-axis calculated in the speed calculation process (S22).

Namely, the displacement can be calculated by $P=(\lambda/2)*t^2+Ct+C'$ (equation 2).

Referring to the equation 2, A is average acceleration in the point 140, t is a time from the standard position to the point 140, C is a speed calculated by the previous speed calculation process (S22) and C' is displacement calculated by the previous displacement calculation process.

By the equation 2, the displacement (Px, Py, Px) is calculated, and this is recorded in the flash memory 18 as movement locus information.

Next, a process which records positional information by a predetermined sign will be described. This process is performed along with a process which calculates positional information illustrated in FIG. 1. For example, in an imaging device, the release button SW1 is pressed as a sign, and the process which records the positional information is performed by this sign.

Figure 4:
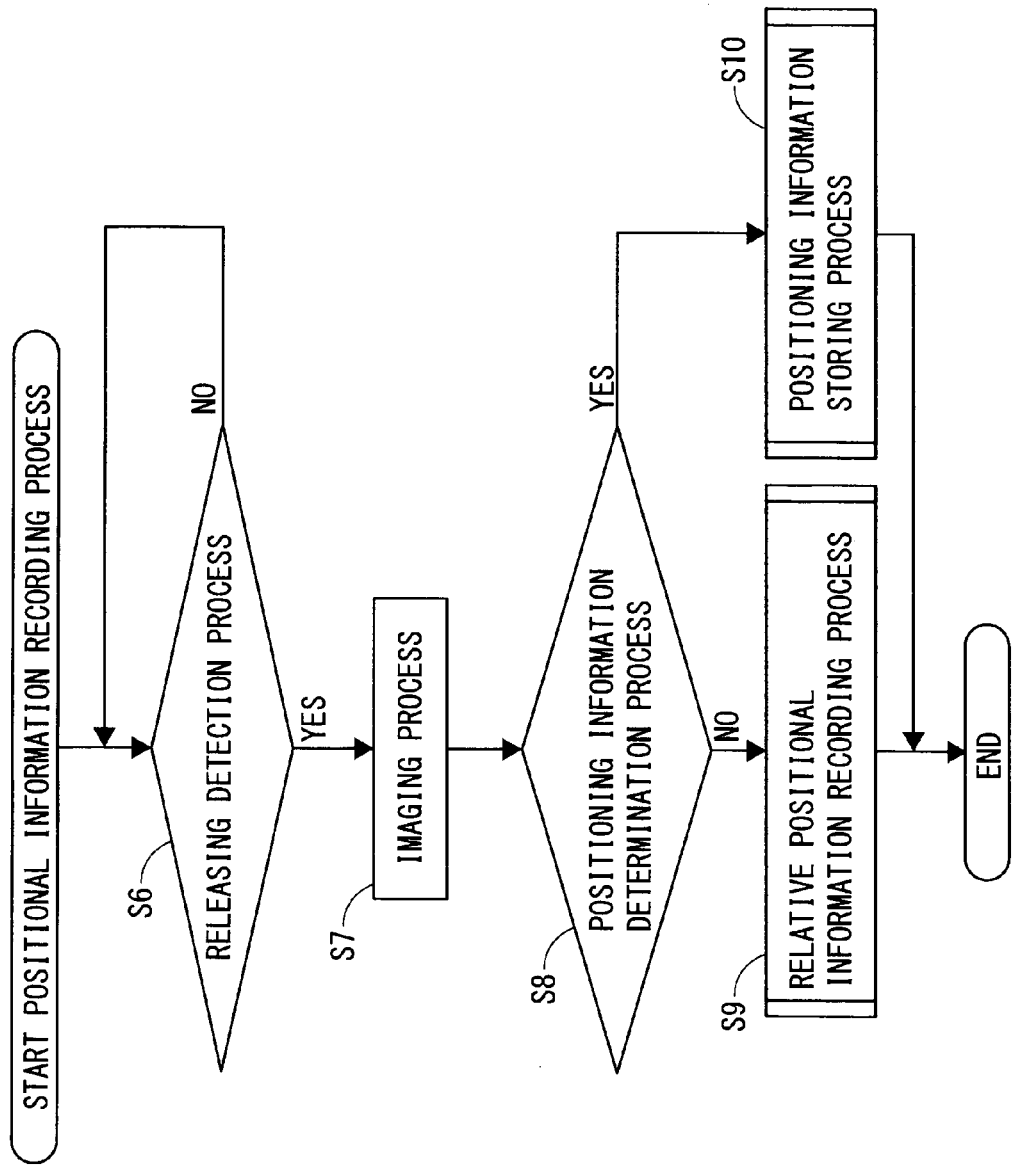
FIG. 4 is a flow chart illustrating an example of the positional information recording process which is performed by the positional information recorder according to the embodiment of the present invention.

An example of the positional information recording process will be described by using the flow chart in FIG. 4. The recording method of the positional information is not limited thereto. The positional information recording process illustrated in FIG. 4 uses as an example a process which records positional information of a shooting location together with an image shot by the imaging device 1 (refer to FIGS. 1, 2).

At first, if a predetermined operation (pressing) of the release button SW1 which is the shooting trigger and the sign of the recording of positional information is detected (YES in S6), an imaging process is performed (S7). The process is looped (No in S6) until a predetermined operation (releasing) of the release button SW1 is detected.

The imaging process (S7) is a process which generates image data by performing a predetermined image process with the imaging section 12 (FIG. 2) on a subject image obtained by the lens barrel unit 2 (FIG. 1) including the zoom lens and the focus lens of the imaging optical system. The generated image data is displayed on the display 20 and is recorded in the flash memory 18 as an image file or the external recorder 19.

Next, it is determined whether or not the positioning information is calculated (S8). This determination process (S8) determines whether or not the positioning information is recorded in the flash memory 18. If the positioning information is not calculated (NO in S8), a relative positional information recording process (S9) is performed.

If the positioning information is calculated (YES in S8), a positioning information storing process (S10) is conducted.

The positioning information storing process is a process which stores the positioning information with GEOTAG format in an EXIF header of the image file generated in the imaging process (S7).

Figure 5:
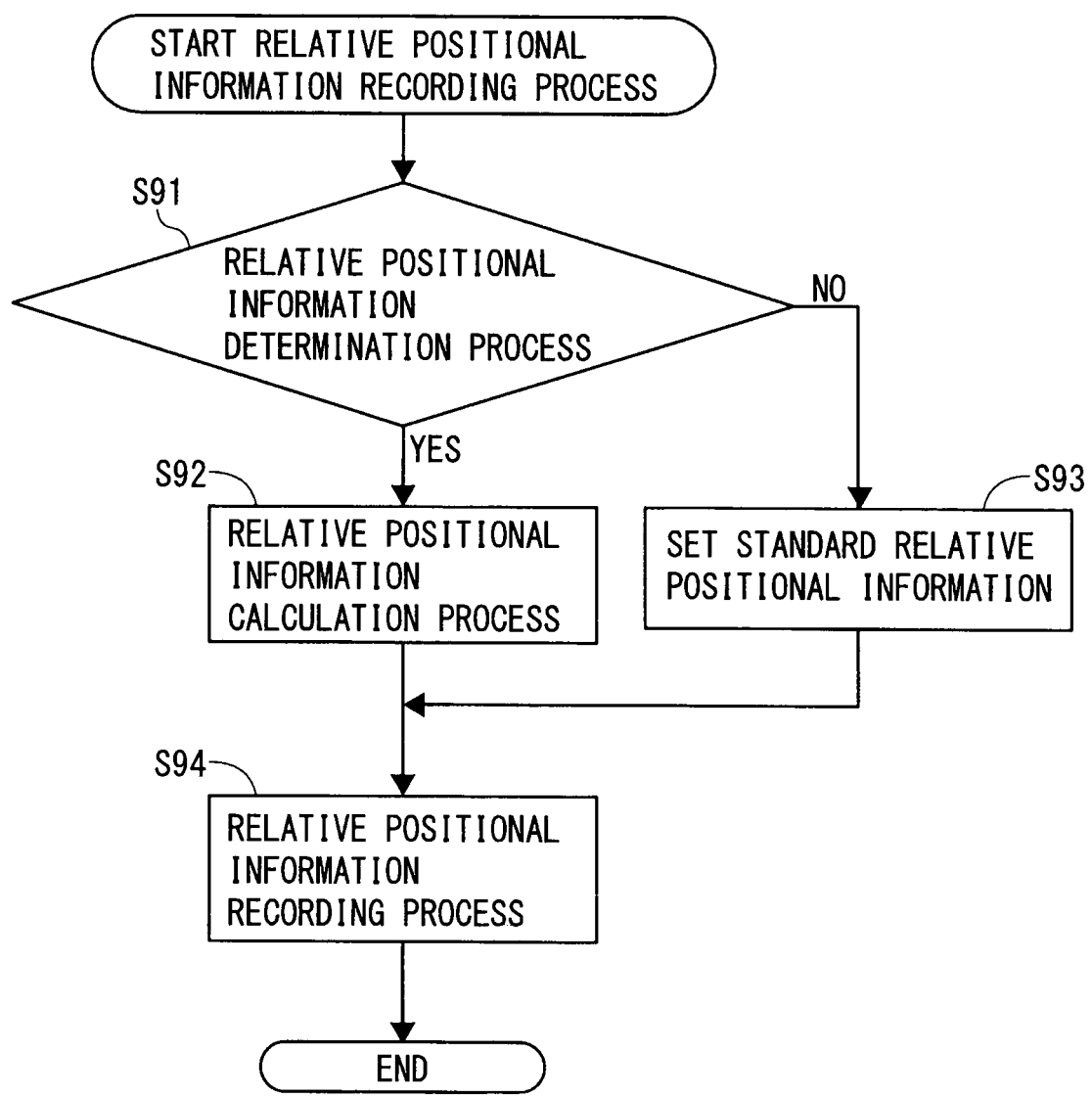
FIG. 5 is a flow chart illustrating an example of a relative positional information recording process which is performed by the positional information recorder according to the embodiment of the present invention.

Next, the details of the relative positional information recording process (S9) will be described with reference to the flow chart in FIG. 5.

At first, it is determined whether or not the relative positional information is already recorded (S91). If the relative positional information is not recorded (NO in S91), the position at the present point (shot position) is recorded in the flash memory 18 as the standard relative position (S93).

If the relative positional information is already recorded (YES in S91), the relative positional information at the present point is calculated by using the relative positional information recorded in the latest timing of the recorded relative positional information and the movement locus information (FIG. 6) recorded up to the present point (S92).

Next, the calculated relative positional information or the standard relative positional information associated with the image file generated by the imaging process (S7) is recorded (S94) in the flash memory 18. Since the image file includes a file format according to EXIF standard, the relative positional information can be recorded while being associated with the image file by storing the relative positional information in the marker note section of the header file.

In addition to the relative positional information recording process (S94), a process which records predetermined flag information indicating "relative positional information" in the RAM 17 may be performed such that the determination in the relative positional information determination process (S3) can be easily performed.

Figure 9:
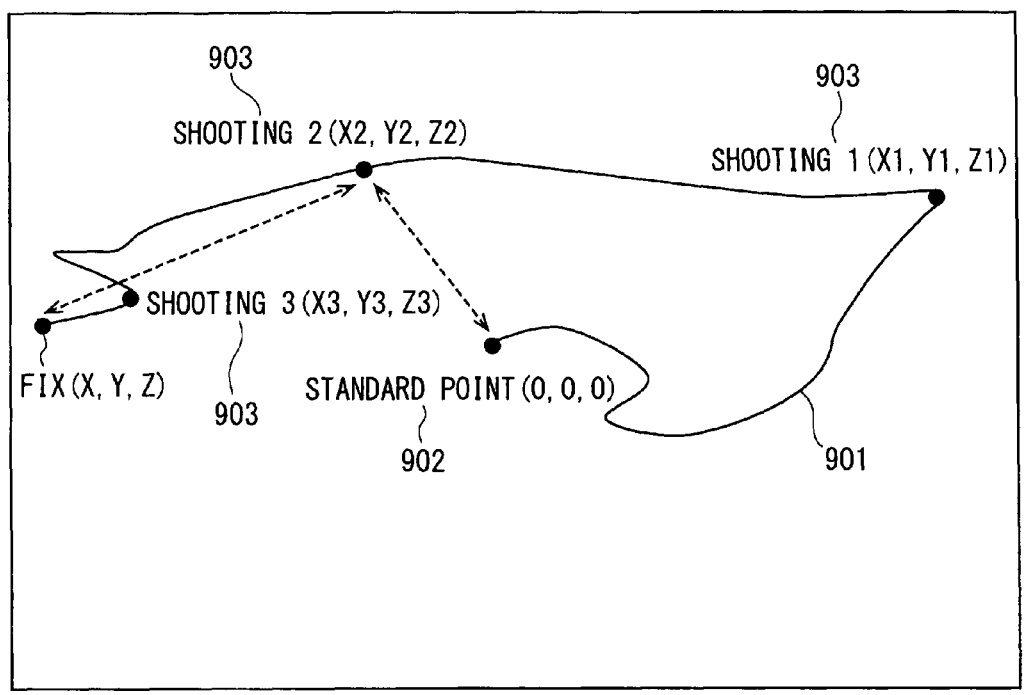
FIG. 9 is a schematic view illustrating an example of movement locus information for use in the calculation of the relative positional information in the positional information recorder according to the embodiment of the present invention.

Here, the details of the relative positional information calculation process (S92) will be described. FIG. 9 is a view illustrating an image of the movement locus information for use in the calculation of the relative positional information.

FIG. 9 illustrates the movement locus information by the line 901. If the power source of the device is turned on, the sign is detected (S6 in FIG. 4) before the device becomes the positioning information calculable state, and the relative positional information is not recorded (NO in S91), that point is recorded as the standard point 902. The relative positional information of the standard point is (0, 0, 0).

Next, when the sign is detected (S6 in FIG. 4), if the positioning information is not calculated, the relative positional information 903 (shooting 1) according to this position is recorded.

The relative positional information 903 is recorded (S94 in FIG. 5) as the relative positional information 903 (X1, Y1, Z1) which is the distance from the standard point 902 of each of X, Y, Z based on the movement locus information calculated after the standard point 902 is recorded.

Moreover, when the sign is detected next (S6 in FIG. 4), if the positioning information is not calculated, the relative positional information 903 (shooting 2, X2, Y2, Z2) according to that point is calculated based on the movement locus information calculated from the last relative positional information 903 (shooting 1), and it is recorded as the relative positional information of that point (S94).

FIG. 9 illustrates a condition in which up to the relative positional information 903 (X3, Y3, Z3) is recorded by the next sign.

As described above, the relative positional calculation process (S92) calculates the distance from the standard relative position as the coordinate information based on the movement locus information from the standard relative position (0, 0, 0).

Next, the detailed process of the relative positional information conversion process (S4 in FIG. 3) will be described with reference to FIG. 9. In FIG. 9, the positioning information is not calculated for a while from the point of the shooting 3.

The point where the positioning information is calculated after that is FIX 904. The positioning information at the point of the shooting 3 is calculated by the positioning information of FIX 904 together with the movement locus information based on the movement locus information from the shooting 3 (X3, Y3, Z3) to the FIX 904. This positioning information is conversion positional information.

As illustrated in FIG. 9, since three types of relative positional information including the standard point are illustrated, the positional information of each point is calculated for all of the relative positional information by the positioning information of FIX 904 together with the movement locus information.

As described above, the conversion process is performed at the point when the positioning information is calculated in order from the latest relative positional information recorded by then.

More specifically, a process, which converts positional information relatively calculated by then supposing FIX 904 as a standard position of the positioning information according to the positioning information, is the relative positional information conversion process (S4).

Consequently, the calculated conversion positional information is stored as GEOTAG in the EXIF header of the image data corresponding to the original relative positional information (S5). In this case, the information indicating the conversion positional information may be stored in the marker note section of the EXIF header.

As described above, according to the positional information recorder of the embodiment of the present invention, when accurate positioning can be performed by radio waves, the relative positional information is recorded by the movement locus from the virtually set standard position. Then, when the positioning information is calculated, the relative positional information can be converted into the positional information according to the positioning based on the positioning information and the movement locus information by then.

Therefore, even in a tunnel or a basement to which radio waves do not reach, or even if the positioning information can not be calculated just after the start of activation, further accurate positional information can be recorded.

By installing this positional information recorder in an imaging device, the positional information of the shot position can be accurately recorded regardless of the radio wave condition, and the photographing can be performed without waiting for the calculation of the positioning information.

Figure 7:
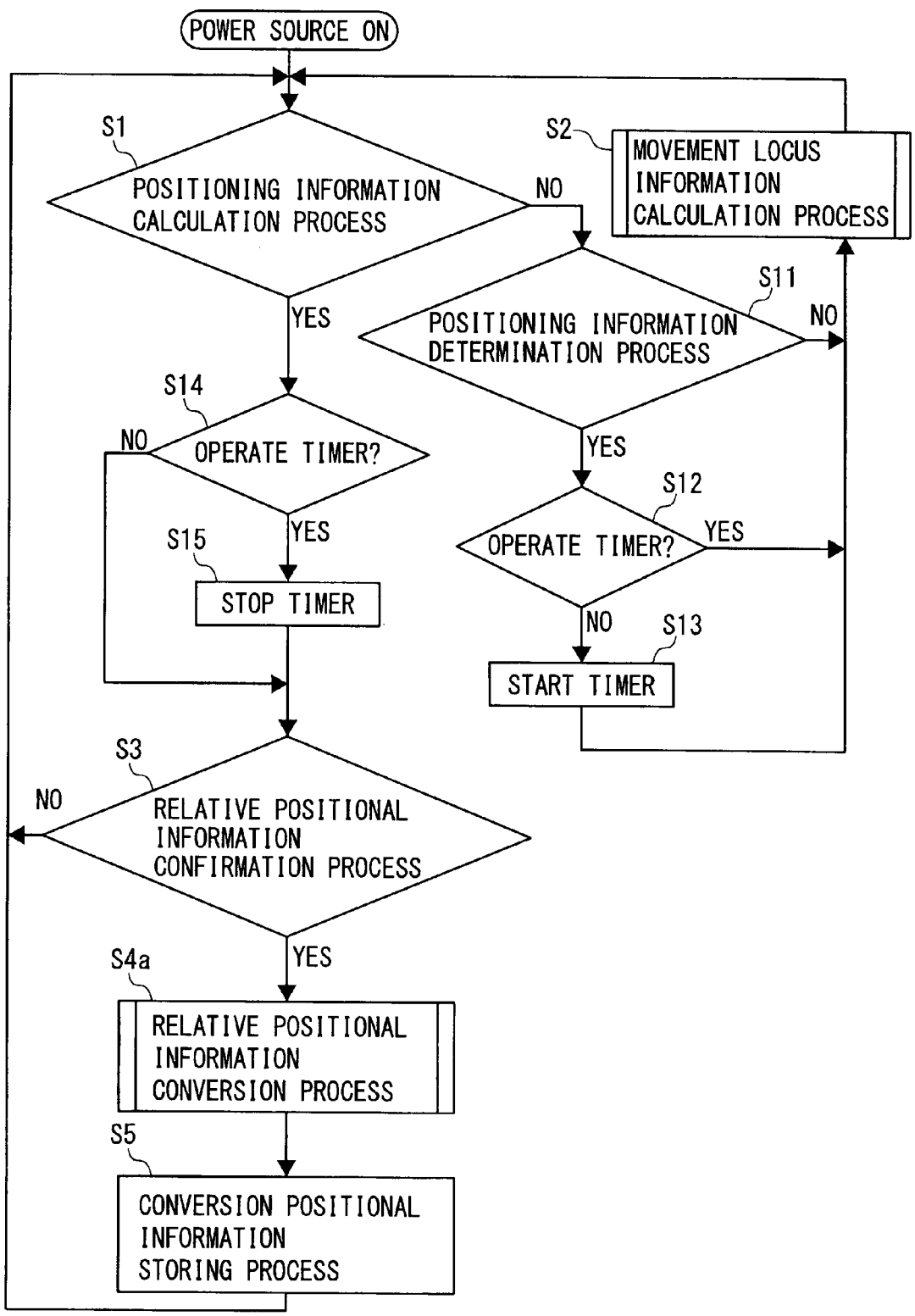
FIG. 7 is a flow chart illustrating another example of a positional information calculation process which is performed by the positional information recorder according to the embodiment of the present invention.

Next, another embodiment of an imaging device will be described. FIG. 7 is a flow chart illustrating another example of a positional information recording method according to the present embodiment.

The same reference numbers are given to the processes which are the same as those in the positional information recording method according to the above-described embodiment.

In this embodiment, if a radio wave receivable condition is changed, for example, after a positioning information calculable condition, and an imaging device realizes a condition which can not calculate accurate positional information, relative positional information is recorded during a radio wave unstable receiving condition, and if the imaging device realizes a condition which can calculate accurate positioning information again, duty of a process, which converts the relative positional information recorded by then into positioning information, can be reduced.

If the operation of the device is started by turning on a power source, the initialization process of the positional information calculator 16 is conducted, and the receiving of the radio waves is started. If the radio waves are sufficiently received, the positioning information is calculated at predetermined time intervals, and is sequentially recorded in the flash memory 18 (S1).

After that, if the receiving condition of the radio waves from the satellite is preferable, the positioning information is calculated (YES in S1), and if the relative positional information is not obtained, the positioning information is repeatedly calculated (NO in S3).

If the imaging device is not in a condition which can calculate the positioning information (NO in S1), it is determined (S11) whether or not the positioning information is previously calculated before starting the movement locus information calculation process (S2). Thereby, it is determined whether the present condition is a condition which can not calculate the positioning information by the deterioration in the radio wave condition or the activation start of the device.

If the positioning information is not calculated in the past (NO in S11), the movement locus information calculation process (S2) is started, and the process is repeated.

If the positioning information is calculated (YES in S11) in the past, it is determined whether or not the timer is already operated (S12). If the timer is not operated, the movement locus information recording process (S2) is started after starting the timer (S13).

In this case, the timer operated in S13 is to measure the time of the condition which can not calculate the positioning information.

After the process returns to S1, if the device is the positioning information calculable condition (YES in S1), it is determined whether the timer is operated or not (S14) by then, and the process moves onto the relative positional information confirmation process (S3) after stopping the operating timer (S15).

Figure 8:
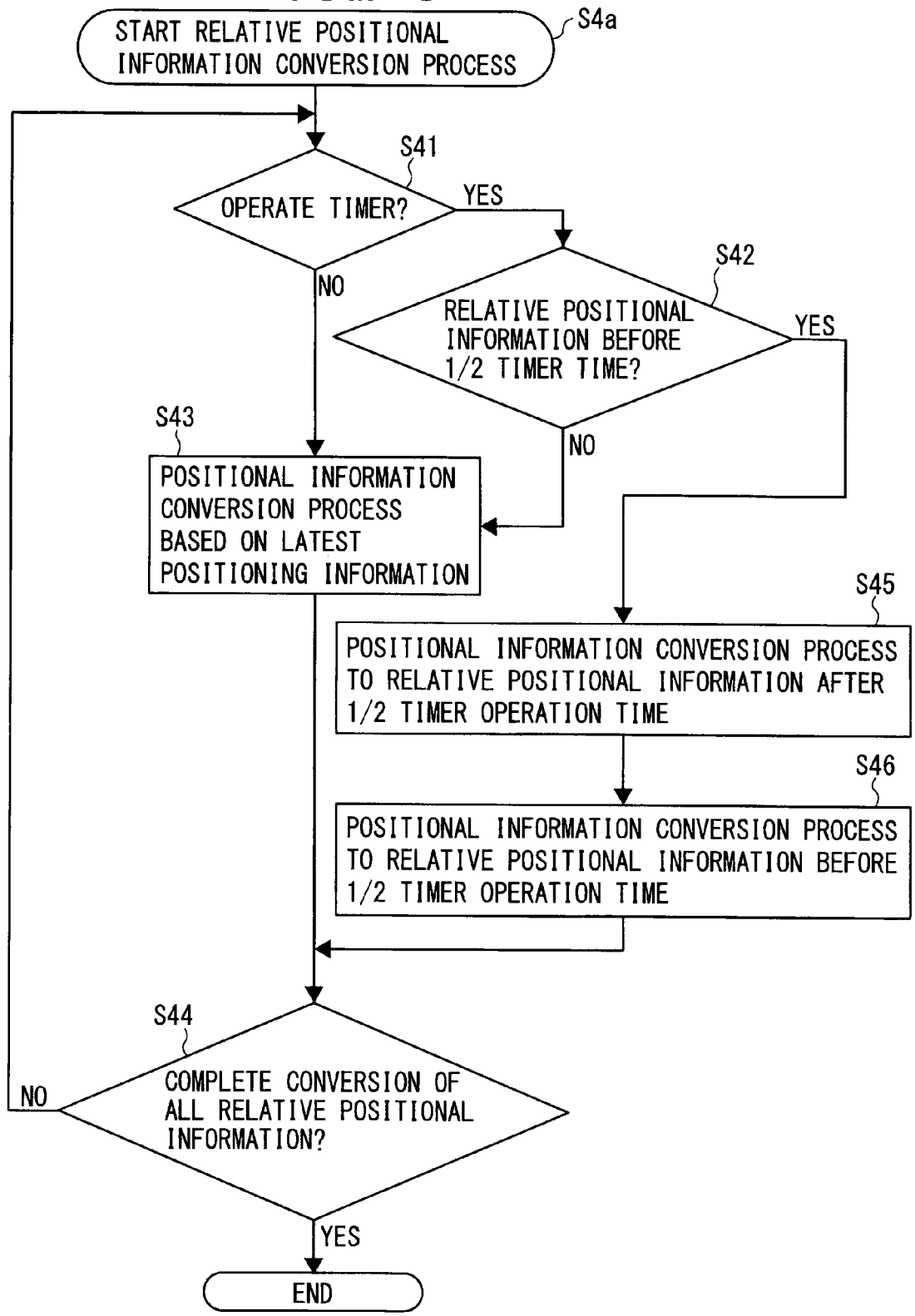
FIG. 8 is a flow chart illustrating another example of a relative positional information recording process which is performed by the positional information recorder according to the embodiment of the present invention.

Next, the details of the relative positional information conversion process (S4a) when the relative positional information is recorded during the operation of the timer will be described with reference to the flow chart in FIG. 8.

If the relative positional information is recorded by the time the positioning information is calculated (YES in S3 of FIG. 7), it is determined whether or not the timer is operated (S41).

If the timer is not operated (No in S41), the positional information conversion process based on the latest positioning information is performed (S43). The conversion process in S43 is the same as the relative positional information conversion process (S4) according to the already described embodiment.

If the timer is operated (YES in S41), it is determined whether or not the relative positional information is recorded or not by a time corresponding to half of the operation time of the timer (½) (S42).

If the relative positional information is not recorded (NO in S42) by the time corresponding to half of the timer operation time (NO in S42), the process which converts the relative positional information into the positioning information is performed based on the latest positioning information (S43).

If the relative positional information is recorded by the time corresponding to half of the timer operation time (YES in S42), the conversion process based on the latest positioning information is performed (S45) with respect to the relative positional information recorded after passing half of the timer operation time of the recorded relative positional information.

Next, the conversion process from the relative positional information to the positioning information is performed (S46) based on the positioning information just before the imaging device realizes the positioning inability with respect to the relative positional information recorded before half of the timer operation time of the recorded relative positional information.

In the present embodiment, the determination standard which uses the latest positioning information or the positioning information just before the positioning inability as the positioning information for use in the process which converts the relative positional information into the positioning information is described with the time corresponding to half of the timer operation time. However, in this embodiment, the determination standard is not limited thereto. By setting the predetermined point in the timer operation time (time measured by timer) as the determination standard, the effects similar to the present embodiment can be obtained.

For example, the time difference for obtaining the latest positioning information and the positioning information just before the positioning inability in which the accuracy of the latest positioning information (which is determined by the number of additional satellites) and the accuracy of positioning information just before the positioning inability exceed a predetermined time and are the same is set as the timer operation time, and the half point of this time difference may be the predetermined point.

Moreover, when the number of additional satellites in the calculation of the latest positioning information is different from the number of additional satellites in the calculation of the positioning information just before the positioning inability, the predetermined time may be determined in accordance with the difference of the number of additional satellites. For example, in accordance with the ratio of the number of additional satellites, the number of relative positional information which realizes the target of the above conversion process (S46) is determined. Namely, the conversion process using the positioning information having a large number of additional satellites may be performed many times. Consequently, a further accurate conversion process (S46) can be performed.

A reason for performing different conversion processes in S45, S46 at recording timing of the relative positional information will be described.

As described above, the conversion process from the relative positional information into the positional information converts each of the relative positional information into the positioning information while traveling back in time series based on the latest positioning information. If the relative positional information is recorded after the calculation of the positioning information, the conversion process is performed on the oldest relative positional information based on the relative positional information calculated in the past after the positioning information is calculated without performing the conversion process based on the latest positioning information. Consequently, the accuracy can be further improved.

Accordingly, as described in the present embodiment, if the relative positional information conversion process (S4a) is performed after the operation of the timer, the conversion process is performed on the relative positional information before half of the timer time by using the latest positioning information of the previously calculated positioning information, and the conversion process is performed on the relative positional information after half of the timer time by using the latest positioning information.

The above process is performed on all relative positional information (S44).

As described above, according to the positional information recording method of the present embodiment, even if the positioning information can not be calculated by the change in the radio wave condition, the relative positional information can be converted into further accurate positioning information by the positioning information calculated after the change in the radio wave condition and the positioning information calculated before the change in the radio wave condition.

The positional information recorder according to the embodiments of the present invention can be applied to, for example, a portable navigation device in addition to an imaging device.

Although the embodiments of the present invention have been described above, the present invention is not limited thereto. It should be appreciated that variations may be made in the embodiment described by persons skilled in the art without departing from the scope of the present invention.

According to the embodiments of the present invention, in a preferable radio wave receiving condition, accurate positional information obtained by the positioning with radio waves is recorded. In a poor radio wave receiving condition, or in a positioning inability condition due to initialization of a device, the relative positional information which can be calculated by the relative displacement from the standard position (for example, the last positional information received by the positioning of radio waves) is recorded, and then, when the device realizes a positional condition with radio waves, the relative positional information recorded by then can be converted into the positional information which is similar to the accurate positional information obtained by the positioning. Accordingly, the accurate positional information can be recorded regardless of the radio wave receiving condition.

Moreover, by installing the positional information recorder in the imaging device, the image data shot just after the activation of the device and in underground which can not receive radio waves can be stored together with accurate positional information.

What is claimed is:

1. A positional information recorder, comprising:
    a receiver configured to receive a wireless signal;
    an operation section configured to indicate a sign for recording positioning information;
    a positional information calculator configured to measure a geographical position based on the wireless signal and calculate positioning information according to the geographical position;
    a positioning information recorder configured to record the calculated positioning information;
    an acceleration detector configured to detect a movement direction and a movement amount;
    an inclination specifier configured to specify an inclination of the acceleration detector;
    a movement locus information calculator configured to calculate displacement information including a moving distance and a direction from a standard position;
    a relative positional information recorder configured to calculate, for each of a plurality of points, relative positional information according to a relative position from the standard position by the displacement information upon determination that the calculated positioning information is not obtained, and record the calculated relative positional information for each of the plurality of points associated with information according to the sign; and
    a positional information convertor configured to, upon determination that the calculated positioning information is obtained, convert the relative positional information of the plurality of points previously recorded in the relative positional information recorder into the positioning information, the conversion from the relative positional information into the positioning information performed in order from a latest calculated relative positional information in which the calculated positioning information was obtained to an earlier calculated relative positional information in which the calculated positioning information was not obtained.

2. The positional information recorder according to claim 1, further comprising:
    a geomagnetism detector configured to detect a standard orientation, wherein
    the movement locus information calculator calculates the displacement information based on the movement direction detected by the acceleration detector and the standard orientation detected by the geomagnetism detector.

3. The positional information recorder according to claim 1, further comprising:
    a timer configured to measure a time in which positioning according to the wireless signal is not performed, wherein
    the positional information convertor is further configured to perform a conversion based on a calculated positioning information measured just before the positioning inability relative to the relative positional information recorded before a predetermined point of the measured time of each of the relative positional information recorded in the relative positional information recorder, and
    the earlier calculated relative position information corresponds to a relative position information calculated after the predetermined point of the measured time of each of the relative positional information recorded in the relative positional information recorder.

4. The positional information recorder according to claim 1, wherein the positional information convertor is configured to convert the plurality of relative positional information into the positioning information representing the standard position.

5. The positional information recorder according to claim 1, wherein the positional information convertor is configured to convert all of the plurality of relative positional information into the positioning information.

6. An imaging device, comprising:
    the positional information recorder according to claim 1;
    an imaging section configured to obtain an optical image showing a subject via an imaging optical system and an imaging element, and convert the optical image into image data; and
    an image reorder configured to record the image data converted by the imaging section, wherein
    the operation section includes a release button, and
    the image data obtained by the operation of the imaging section with the sign is associated with the positioning information or the relative positional information, to be recorded.

7. A positional information recording method which is performed by a positional information recorder, the positional information recording method comprising;
    a step of receiving a wireless signal by a receiver;
    a step of detecting a sign for recording a positioning information;
    a step of determining whether or not the positioning information can be calculated by measuring a geographical position based on the wireless signal when the sign is indicated;
    a step of detecting, by an acceleration detector, a movement direction and a movement amount;
    a step of specifying, by an inclination specifier, an inclination of the acceleration detector;
    a step of starting calculation of a displacement information including a moving direction and a direction from a standard position by a movement locus information calculator when it is determined that the calculated positioning information was not obtained;

a step of calculating, for each of a plurality of points, relative positional information according to a relative position from the standard position by the displacement information upon determination that the calculated positioning information is not obtained and upon determination that the sign is indicated;

a step of recording, in a relative positional information recorder, the calculated relative positional information for each of the plurality of points associated with the information according to the sign; and upon determination that the calculated positioning information can be obtained, a step of obtaining calculated positioning information, and converting the relative positional information of the plurality of points previously recorded in the relative positional information recorder into the positioning information, the conversion from the relative positional information into the positioning information performed in order from a latest calculated relative positional information in which the calculated positioning information was obtained to an earlier calculated relative positional information in which it was determined that the calculated positioning information could not be obtained.

8. The positional information recording method according to claim 7, further comprising:

a step of detecting a standard orientation by a geomagnetism detector;

a step of specifying, by the movement locus information calculator, a standard orientation detection result of the geomagnetism detector; and a step of calculating, by the movement locus information calculator, a moving speed by the output of the acceleration detector, and a displacement from the standard position based on the inclination, the moving direction and the speed.

9. The positional information recording method according to claim 7, further comprising:

a step of measuring, by a timer, a time in which positioning according to the wireless signal is not performed;

a step of determining whether or not the relative positional information is recorded before a predetermined point of the measured time; and upon determination that the relative positional information is recorded before the predetermined point, converting the relative positional information into the positioning information by using a calculated positioning information measured just before the positioning inability relative to the relative positional information recorded before the predetermined point of each of the relative positional information recorded in the relative positional information recorder, wherein the earlier calculated relative position information corresponds to a relative position information calculated after the predetermined point of the measured time of each of the relative positional information recorded in the relative positional information recorder.

* * * * *